Feb. 28, 1950     B. STOUDT     2,499,262
SELF-ADJUSTING PNEUMATIC PRESSURE SWITCH
Filed July 24, 1948     3 Sheets-Sheet 3
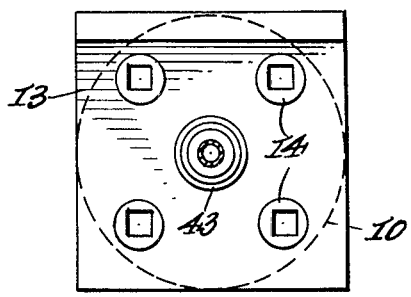
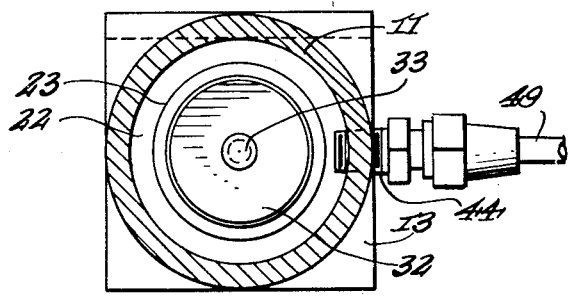
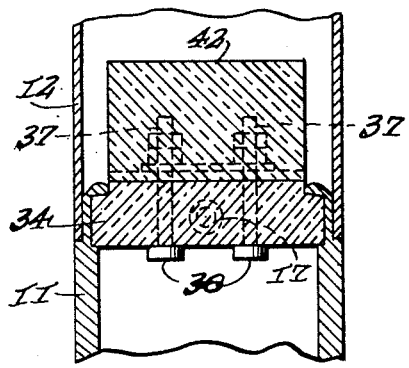
INVENTOR.
B. STOUDT,
BY J. Ledermann
ATTORNEY.

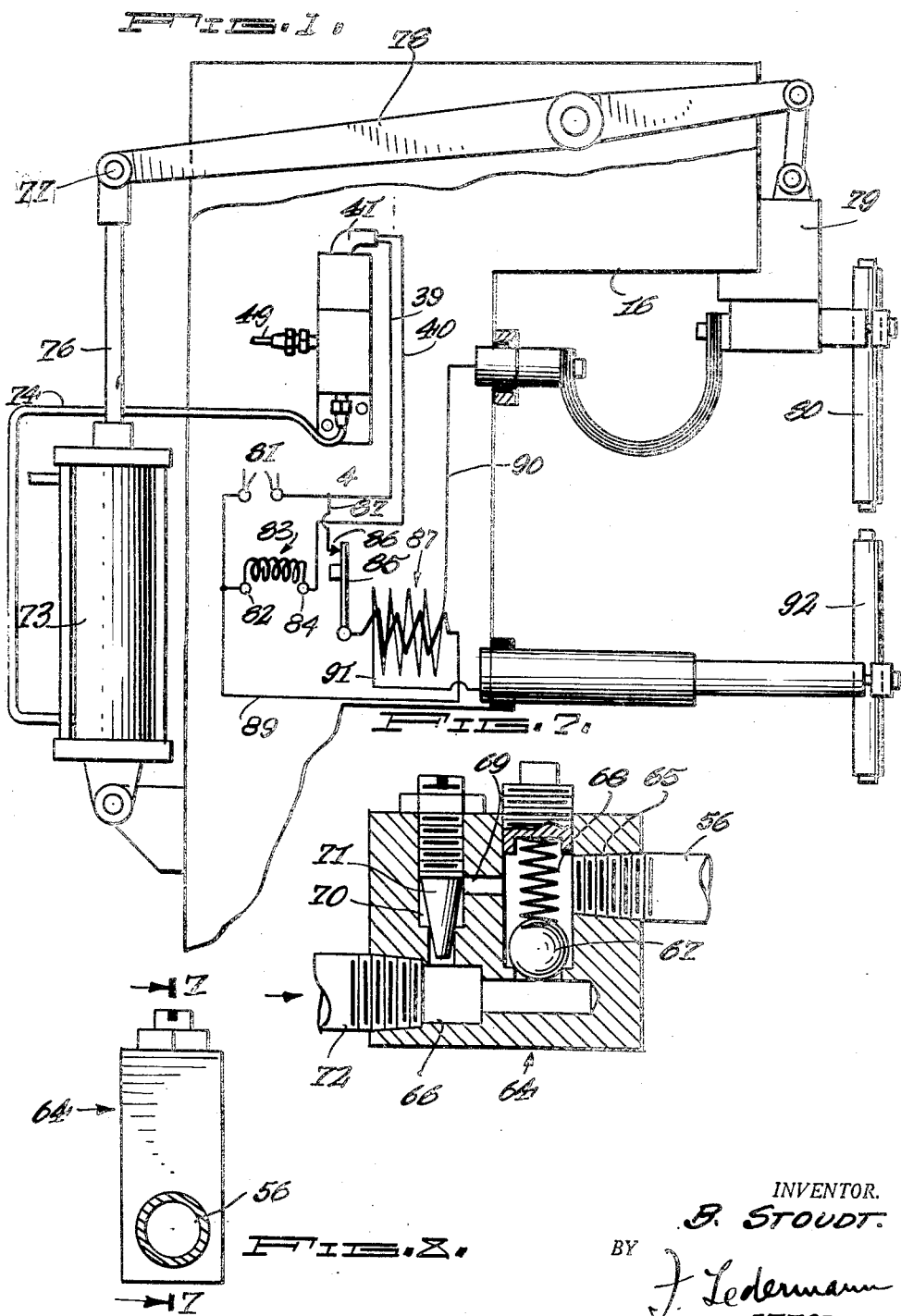

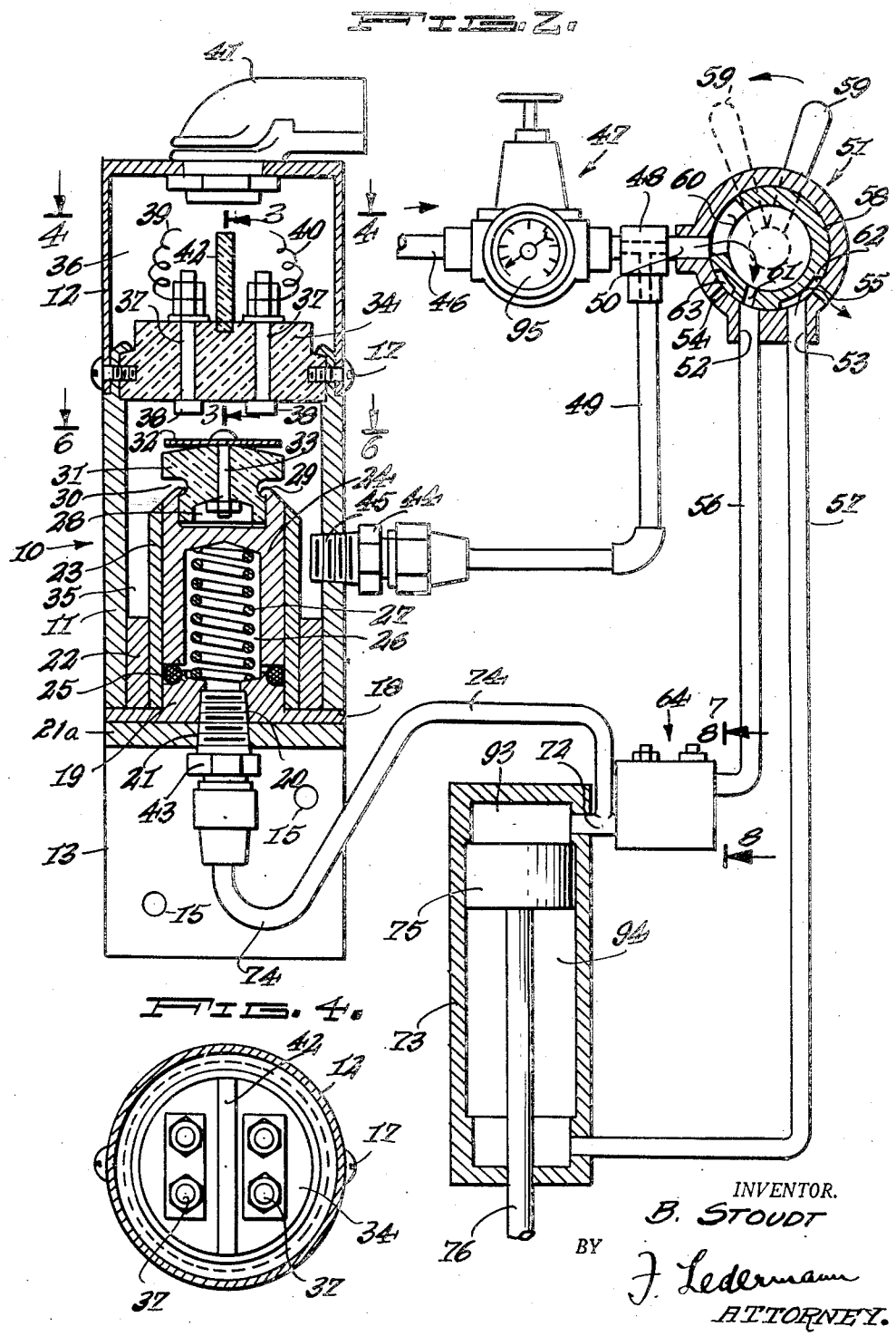

Patented Feb. 28, 1950

2,499,262

UNITED STATES PATENT OFFICE 2,499,262

SELF-ADJUSTING PNEUMATIC PRESSURE SWITCH

Bernard Stoudt, Brooklyn, N. Y., assignor to Ames Spot Welder Co., Inc., Brooklyn, N. Y., a corporation of New York Application July 24, 1948, Serial No. 40,535

3 Claims. (Cl. 200—82)

This invention relates to air-operated pressure switches, and although it is presented herein as applied to air operated welding machines the invention may be used for other purposes or in other applications.

The main object of the invention is the provision of a self-adjusting pneumatic pressure switch, including a cylinder having a plunger therein, which will prevent the closing of an electrical circuit until the gage pressure, that is, the pressure set and indicated on the pressure regulator, is reached. In the application of this invention to a spot welding machine, the invention assures the necessary pressure at the welder tips before current passes through the electrodes.

In the case of every cylinder having a piston therein, a certain amount of air pressure is required to overcome the inertia and friction of the piston and the parts driven by the piston. Therefore, regardless of the pressure exerted on the piston of a cylinder (which pressure in this example is regulated by a speed regulator), the percentage of air pressure required to perform the aforementioned function becomes less as the regulated gauge pressure becomes greater. Thus when the piston reaches the end of its stroke, the regulated gauge pressure is built up and the necessary pressure is exerted at the electrode points. At low gauge pressure, the pressure switch will close its contacts almost immediately after the electrode points meet. At high pressures, although the points close faster, there is a slightly longer lapse of time between the meeting of the points and the closing of the switch contacts. This condition is highly desirable in spot welding machines as it eliminates firing of the welder while the tips are bouncing (which is caused by the points at first hitting under higher air pressure). This assures uniform positive pressure on the welding points at all times.

The above broad as well as additional and more specific objects will become apparent in the following description, wherein characters of reference refer to like-numbered parts in the accompanying drawings. It is to be understood that the drawings are intended for the purpose of illustration only, and that it is neither desired nor intended to limit the invention necessarily to any or all of the exact details of construction shown except insofar as they may be deemed essential to the invention.

Referring briefly to the drawings, Fig. 1 is a fragmentary side elevational view of a spot welding machine, showing fragmentarily the invention applied thereto, and including a wiring diagram.

Fig. 2 is a largely schematic view, partly in section, showing the air pressure cylinder, the pressure regulator, the operating valve, and in central longitudinal cross-section, the pneumatic pressure switch of this invention, together with the piping connections of the various parts mentioned.

Fig. 3 is a sectional view taken on the line 3—3 of Fig. 2.

Fig. 4 is a sectional view taken on the line 4—4 of Fig. 2.

Fig. 5 is a bottom plan view of the pneumatic pressure switch per se.

Fig. 6 is a sectional view taken on the line 6—6 of Fig. 2.

Fig. 7 is a sectional view taken on the line 7—7 of Fig. 8.

Fig. 8 is a sectional view taken on the line 8—8 of Fig. 2.

Referring in detail to the drawings, the numeral 10 indicates a cylindrical housing formed of two separable parts 11 and 12 and supported on and secured to a bracket 13 by means of, for example, socket bolts 14. The latter is provided with openings 15 through which screws or bolts, not shown, are adapted to be passed to mount the housing 10 on the frame or housing 16 of a spot welding machine. Screws 17 join the cap 12 to the upper portion 11 of the housing 10.

The lower end of the housing 10 is closed by a disc or cover 18 provided with a raised axial boss 19 having a threaded opening 20 therethrough, an aligned opening 21 being provided in a plate 21a at the bottom of the housing 10.

A cylindrical spacer 22 registers within the lower housing 11 and rests on the cap 18. A cylinder 23 registers between the boss 19 and the spacer 22 and is fixed in place. A plunger 24 is slidably mounted in the cylinder 23 and normally rests on a ring 25 registering in an appropriate peripheral groove in the boss 19. The plunger 24 is provided with a concentric bore 26 in an upward direction from the bottom, and a compression spring 27 has its lower end on the boss 19 and its upper end against the roof of the bore 26, normally urging the plunger upward. The plunger 24 has a socket 28 formed in the upper end thereof, the peripheral edge 29 of which is turned inward to form a lock flange by engaging a circumferential groove 30 in a head 31 of insulating material. A metal contact disc, which may be of silver and is shown at 32, is held on the head 31 by means of a screw 33. It is to be noted that the upper surface of the head is approximately conical or rounded and tapers toward the axis in an upward direction, and as a result the contact disc 32 possesses a degree of resiliency around its edge.

Secured by the screws 17 as a partition between the housing 11 and the cap 12, is a cylindrical block 34 of insulating material which seals off the compartment 35 enclosed by the housing 11 from the compartment 36 enclosed by the cap 12. Spaced contact screws 37 extend through the block 34 and have heads 38 on their lower ends; their upper ends serve as binding posts for leads 39 and 40 which pass through an elbow 41 and thus out of the cap 12. An upright baffle 42 of insulating material extends from the block 34 between and higher than the screws 37.

A nipple 43 extends from the opening 28, and a nipple 44 extends from a similar threaded opening 45 in the housing 11 into the compartment 35. Air under pressure enters, through the pipe 46, the pressure regulator 47 and passes through a T 48. A pipe 49 connects one passage of the T 48 with the nipple 44. A connection 50 leads the other passage of the T 48 into a control valve 51, or, as it might be better termed, the operating valve. This is a common type of valve, and from its two passages 52 and 53 pipes 56 and 57, respectively, extend. Air or exhaust vents are provided at 54 and 55. The valve cylinder 58, which is turned by the handle 59, has a wide radial passage 60 and a narrow radial passage 61 therethrough. Surface groove passages 62 and 63 are further provided in the cylinder 58. In the position of the valve shown in Fig. 2, air entering through the passage 60 into the cylinder 58 passes through the passage 61 into the pipe 56, and air entering the valve from the pipe 57 passes through the passage 62 and out through the vent 55 into the atmosphere. When the handle 59 is moved to the left to the position shown in broken lines, air entering through the passage 60 will pass through the passage 61 into the pipe 57, and air entering the valve through the pipe 56 will pass through the passage 63 and through the vent 54 into the atmosphere.

The pipe 56 leads to one of the two openings of a standard speed reducer 64, shown at 65, the other opening being shown at 66. Air flowing through the opening 66 flows freely because owing to its pressure it lifts the ball 67 to enter the passage 68 and exit through the opening 65. However, air entering the opening 65 can flow only through the passages 69 and 70, and owing to the restriction of the latter by the needle valve 71, the flow of air into the opening 66 is at reduced speed.

A pipe 72 leads from the opening 66 into the head end of a cylinder 73. A pipe 74 leads from the nipple 43 also to the head end of the said cylinder. A piston 75 is slidable in the cylinder 73, and its rod 76 is pivoted, in the example illustrated, to a beam 78 at 77, the other end of the beam having a carriage 79 secured thereto and rigidly holding the upper electrode 80. The pipe 57 is connected to the tail of the cylinder 73.

In the wiring diagram of Fig. 1, the supply terminals are shown at 81. The lead 39 is connected to one terminal 81. The other terminal 81 is connected to one terminal 82 of an electromagnet 83, and the lead 40 leads to the other terminal 84 of the latter. The switch contact 86 of the electromagnet leads to the lead 39 through a lead 87. The armature 85 of the electromagnet is connected to one terminal of the primary of a transformer 87, the other terminal of the said primary being connected by a lead 89 to the said other terminal 81. The secondary of the transformer is connected by leads 90 and 91 with the upper and lower electrodes 80 and 92, respectively.

The air or pressure cylinder 73 is divided by the piston 75 into two chambers, the chamber 93 on the head side of the piston, and the chamber 94 on the tail side thereof.

The operating position of the operating valve 51 is that shown in Fig. 2. The pressure which it is desired to apply to the welding points is attained in the regulator 47 and indicated on the gauge 95 thereof. Air flows from the regulator 47 through the pipe 49 into the chamber 35 of the housing 10. This static pressure holds down the plunger 24 and compresses the spring 27; thus, the contact disc 32 is held spaced from the two contact heads 38 of the binding posts 37 and an open circuit is therefore maintained between the latter. Air from the regulator 47 also flows through the T 48 and the operating valve 51, thence through the pipe 56, through the speed regulator 64 and into the chamber 93 of the air cylinder 73, and finally this air also enters the chamber 26 within the plunger 24. However, as the chamber 94 of the cylinder 73 is open to the atmosphere through the pipe 57 and the vent 55 of the valve 51, the piston 75 begins to move (downward, Fig. 2) before the regulated pressure is reached in the chamber 93, thus preventing the plunger 24 from rising to cause the disc 37 to touch the contacts 38 to bridge the latter. As soon as the piston 75 has reached the limit of its travel (downward, Fig. 2), the air pressure in chambers 93 and 26 builds up to the regulated pressure shown on the gauge 95. However, just before the gauge pressure is attained in these chambers, the spring 27 starts to move the plunger 24 to cause the disc 32 to bridge the contacts 38. Thus at approximately the same instant the gauge pressure is reached in the chamber 93 against the piston 75, thereby applying the desired pressure, as shown by the structure in Fig. 1, upon the upper welding electrode 80. Hence, the circuit through the electromagnet 83 and hence the circuit through the electrodes 80 and 92 are closed at approximately the instant when the welding tips are joined against the work, not shown.

When the position of the operating valve is reversed, air under pressure passes into the chamber 94 of the cylinder 73 to force the piston 75 toward its head end, and the air in the chamber 93 of the cylinder 73 and that in the chamber 26 of the plunger 24, is exhausted through the speed reducer (at a high rate of flow), the pipe 56, and out of the valve 51 through the vent 54. Thus the plunger 24 is immediately forced down by the static pressure in the chamber 35, as this pressure remains unaltered, and the disc 32 breaks contact with the post contacts 38. The cycle of operations just described is then ready to be repeated.

In the appended claims the broader term "fluid" is used rather than the term "air," as the device herein described and illustrated on the accompanying drawings may be operated by a liquid such as, for example, oil, or by any suitable gas other than air, as well as by air, all of which fall within the scope of the generic term "fluid."

Obviously, modifications in form and structure may be made without departing from the spirit or scope of the invention.

I claim:

1. In combination, a pressure actuated electric switch including a cylinder having a piston slidable therein, said cylinder having a passage through the wall thereof into the head portion of the interior of the cylinder, said cylinder having a passage through the tail end thereof, spaced electric contacts projecting from said cylinder head into said head portion of the interior of the cylinder, said piston having a metallic member thereon of greater length than the distance between said contacts, said member being adapted to bridge said contacts when said piston is positioned at the head end of its stroke, resilient means normally urging said piston toward said head end, a fluid conduit connected at one end with said first-named passage, a fluid conduit connected at one end with said second-named passage, a second cylinder having a piston slidable therein, said second cylinder having a passage through the head end thereof and a passage through the tail end thereof, the other end of said second-named conduit being connected with said first-named passage of said second cylinder, a main conduit adapted to have fluid under pressure fed thereinto, a third fluid conduit also connected at one end with said first-named passage of said second cylinder, the other ends of said first-named conduit and said third conduit being connected with said main conduit, and a pressure regulating valve in said main conduit adapted to pass fluid under a given pressure through said first-named and third-named conduits, said second-named piston upon admittance of said fluid through said valve being moved thereby toward its tail end thereby preventing building up of pressure in the tail end of said first-named cylinder until said second-named piston has reached the end of its stroke whereupon the fluid in said tail end of said first-named cylinder builds up to the value of said given pressure so that the latter added to the force of said spring moves said first-named piston to the head end of said first-named cylinder thereby engaging said metallic member with said contacts.

2. A fluid pressure apparatus comprising a main conduit adapted to have fluid fed thereinto, a pair of branch fluid conduits connected with said main conduit, a cylinder having a passage through the head end thereof and a passage through the tail end thereof, a piston in said cylinder, one of said branch conduits being connected with said head end passage of said cylinder, a third fluid conduit connected at one end with said head end passage of said cylinder, a housing having a piston slidable therein, said housing having a passage therethrough into the head end thereof and also having a passage therethrough into the tail end thereof, a spring normally urging said second-named piston toward the head end of its said cylinder, the other of said branch conduits being connected with said head end passage of said housing, the other end of said third fluid passage being connected with said tail end passage of said housing, and a pressure regulating valve in said main conduit whereby upon opening said valve fluid under given pressure passes through said branch conduits, said fluid in said other branch conduit passing into said head end of said housing and filling said head end of said housing with fluid at said given pressure thereby urging said second-named piston against and compressing said spring, said fluid entering said tail end passage of said housing having at first a lower pressure than said given pressure owing to the retardation of building up pressure in said third conduit caused by said fluid in said one of said branch conduits causing said first-named piston to travel toward the tail end of its stroke, the pressure of said fluid in said cylinder and hence in said one of said branch conduits and in said tail end of said housing then after said first-named piston reaches its said tail end of its stroke building up to equal said given pressure so that the latter added to the force of said spring moves said second-named piston toward the head end of said housing.

3. The apparatus set forth in claim 2, having a circuit closer comprising at least two electric contacts, one of said contacts being mounted on said housing within the housing, the other of said contacts being mounted on said second-named piston and adapted to contact said one of said contacts when said piston has moved toward the end of said housing as aforesaid to approximately the end of its said stroke.

BERNARD STOUDT.

REFERENCES CITED

The following references are of record in the file of this patent:

UNITED STATES PATENTS

| Number | Name | Date |
| --- | --- | --- |
| 1,542,931 | Foote | June 23, 1925 |
| 2,085,105 | Lex | June 29, 1937 |
| 2,126,490 | Martin | Aug. 9, 1938 |
| 2,293,393 | Humphrey | Aug. 18, 1942 |
| 2,431,674 | Baak | Dec. 2, 1947 |